J. C. Stoddard,
Horse Rake.
No. 45,769.                Patented Jan. 3, 1865.
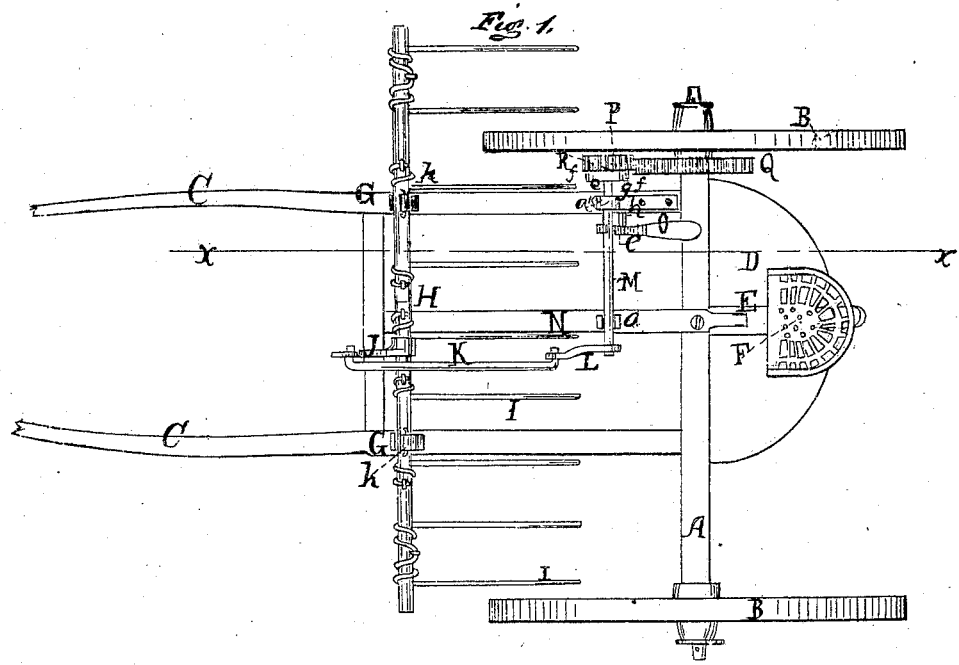
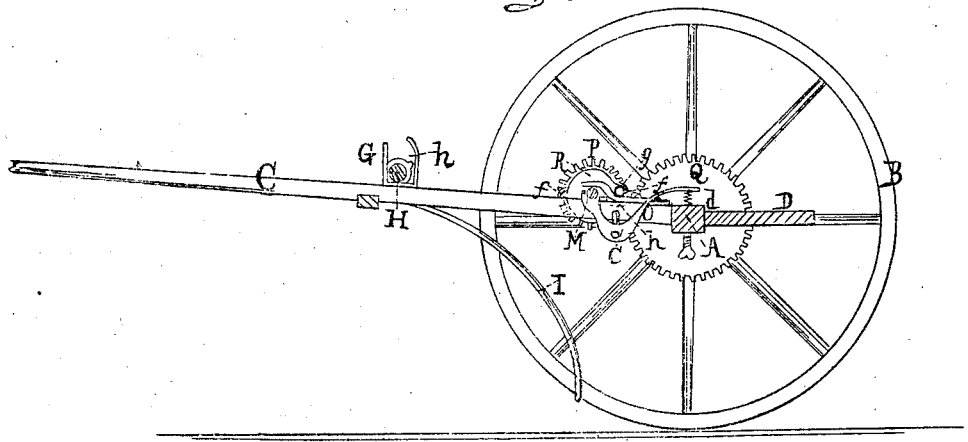
Witnesses.             Inventor.

UNITED STATES PATENT OFFICE.

JOSHUA C. STODDARD, OF WORCESTER, MASSACHUSETTS.

IMPROVEMENT IN HORSE-RAKES.

Specification forming part of Letters Patent No. 45,769, dated January 3, 1865.

*To all whom it may concern:*

Be it known that I, J. C. STODDARD, of Worcester, in the county of Worcester and State of Massachusetts, have invented a new and Improved Horse-Rake; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, a side sectional view of the same, taken in the line $x\ x$, Fig. 1.

Similar letters of reference indicate like parts.

This invention relates to a new and useful improvement in means for operating the rake, so that the latter may be held in proper position to its work and readily raised, when necessary, in order to have its load discharged.

A represents an axle, having a wheel, B, at each end of it, and thills C of usual construction attached to its front end.

At the rear side of the axle A there is a platform, D, having an inclined bar, E, secured to it, which supports the driver's seat F.

To the thills C C, at a short distance in front of the wheels B B, there are secured forks G G, in which the rake-head H is fitted loosely and allowed to slide freely up and down. This rake-head is provided with wire teeth I of the usual form, and at about the center of the rake-head there is a curved arm, J, which is connected by a rod, K, with a crank, L, at the inner end of a shaft, M, the inner bearing, $a$, of which is on a longitudinal bar, N, the outer bearing, $a'$, being on the right-hand thill. This shaft M is allowed to work or move forward and back in its outer bearing, $a'$, and said shaft is fitted in the front end of a lever, O, which has its fulcrum at $c$, and extends back over the axle A, so that it may be operated upon by the foot of the driver.

On the outer end of the shaft M there is a toothed wheel, P, which, when the back end of the lever O is pressed down, is made to gear into a wheel, Q, attached to the hub of one of the wheels B. The back end of the lever O rests upon a spring, $d$, which has a tendency to keep the outer end of the shaft M thrust forward and the wheel P out of gear with the wheel Q. (See more particularly Fig. 2.)

To the inner side of the wheel P there is secured a cam, R, composed of a circular rim, $e$, having a recess, $f$, at each side of its axis to receive a roller, $g$, on an arm, $h$, which is attached to one of the thills. This roller and the recesses $f\ f$ serve as a stop to hold the rake in proper position to its work, and in order to enable the rake to discharge its load the driver depresses the rear end of the lever O and thereby throws the wheel P in gear with the wheel Q, the recess $f$, in which the roller $g$ is fitted, being at the same time drawn from said roller, so that the shaft M may be rotated and the rake-teeth raised in a backward direction, so that its load may be discharged, at which time the other recess, $f$, will be in line with the roller $g$ to hold the rake in an upward position, if necessary, when relieving the lever O. By again throwing the wheel P in gear with Q the rake is lowered to its working position and retained by the roller $g$ and the recess $f$, in which it was first described as being fitted.

The rake-head H is provided with friction-rollers $h\ h$, to admit of it rising and falling freely in the forks G G, so as to conform to the inequalities of the ground over which it passes.

I claim as new and desire to secure by Letters Patent—

The operating of the rake to enable it to discharge its load and to bring it back to a working position by means of the adjustable shaft M, pinion P, having the cam R attached to its inner side, composed of a circular rim, $e$, with two recesses, $f\ f$, the fixed roller $g$, wheel Q, and lever O, with spring $d$, all arranged and combined to operate in the manner substantially as described.

J. C. STODDARD.

Witnesses:
  WM. T. HARLOW,
  T. L. NELSON.